United States Patent
Holcomb

(10) Patent No.: US 7,437,062 B2
(45) Date of Patent: Oct. 14, 2008

(54) REMOTE SENSING SYSTEM CAPABLE OF COREGISTERING DATA FROM SENSORS POTENTIALLY HAVING UNIQUE PERSPECTIVES

(75) Inventor: Derrold Holcomb, Decatur, GA (US)

(73) Assignee: Eradas, Inc., Norcross, GA (US)

( * ) Notice: Subject to any disclaimer, the term of this patent is extended or adjusted under 35 U.S.C. 154(b) by 383 days.

(21) Appl. No.: 11/384,954

(22) Filed: Mar. 20, 2006

(65) Prior Publication Data
US 2007/0104354 A1    May 10, 2007

Related U.S. Application Data

(60) Provisional application No. 60/735,428, filed on Nov. 10, 2005.

(51) Int. Cl.
*G01B 39/00* (2006.01)
(52) U.S. Cl. .............................. 396/7; 396/50; 348/144
(58) Field of Classification Search .............. 396/7–13, 396/50, 332, 333; 382/284, 294, 305; 702/152; 348/144–147

See application file for complete search history.

(56) References Cited

U.S. PATENT DOCUMENTS

| 5,124,915 | A | 6/1992 | Krenzel |
| 5,422,989 | A | 6/1995 | Bell et al. |
| 5,550,937 | A | 8/1996 | Bell et al. |
| 5,596,494 | A | 1/1997 | Kuo |
| 5,765,044 | A | 6/1998 | Murai et al. |
| 5,995,681 | A | 11/1999 | Lee et al. |
| 6,597,818 | B2 * | 7/2003 | Kumar et al. ................ 382/294 |
| 6,664,529 | B2 | 12/2003 | Pack et al. |
| 6,735,348 | B2 * | 5/2004 | Dial et al. .................... 382/293 |
| 6,798,984 | B2 * | 9/2004 | Antikidis ...................... 396/13 |
| 7,127,348 | B2 * | 10/2006 | Smitherman et al. ......... 701/208 |
| 2005/0271264 | A1 * | 12/2005 | Ito et al. ...................... 382/154 |

FOREIGN PATENT DOCUMENTS

WO        WO 01/69535 A2    9/2001

OTHER PUBLICATIONS

*Design Principles of the LH Systems ADS40 Airborne Digital Sensor*, Sandau et al. IAPRS, vol. XXXIII, Amsterdam, 2000 (9 pgs).
*ADS40 Airborne Digital Sensor* Brochure, Leica Geosystems 2001-2002 (8 pgs).

(Continued)

*Primary Examiner*—Jay M Patidar
(74) *Attorney, Agent, or Firm*—Workman Nydegger

(57) ABSTRACT

An aerial imaging system includes a platform capable of moving through the air, a spatial sensor, a plurality of image sensors mounted to the platform and a computer. The spatial sensor collects position data indicating the position of the platform. The plurality of image sensors includes a key sensor and at least one non-key sensor. The computer includes a storage device and a processor configured to execute instructions comprising the steps of (i) controlling the plurality of image sensors to collect image data simultaneously, (ii) determining the exterior orientation of the key sensor based on the position data, and (iii) determining the exterior orientation of at least one non-key sensor based on the exterior orientation of the key sensor.

19 Claims, 7 Drawing Sheets

OTHER PUBLICATIONS

*ADS40 Airborne Digital Sensor* Product Description, Leica Geosystems 2002 (6 pgs).
*Photogrammetric Software for the LH Systems ADS40 Airborne Digital Sensor*, Templemann et al. (8 pgs).
*ADS40—Progress in Digital Aerial Data Collection*, Peter Fricker, Wichmann Veriag, Heidelberg, 2001 (12 pgs).
*ERDAS Field Guide*, Leica Geosystems Geospatial Imaging, LLC 2005 (70 pgs).
*Sensor Modeling for Aerial Mobile Mapping with Three-Line-Scanner (TLS) Imagery*, A. Gruen & L. Zhang, ISPRS Commission II Symposium, 2002 (7 pgs).

\* cited by examiner

REMOTE SENSING SYSTEM CAPABLE OF COREGISTERING DATA FROM SENSORS POTENTIALLY HAVING UNIQUE PERSPECTIVES

CROSS REFERENCE TO RELATED APPLICATION

This application claims the benefit of U.S. provisional patent application No. 60/735,428, filed Nov. 10, 2005.

BACKGROUND OF THE INVENTION

The present invention relates generally to remote sensing. Remote sensing can be defined as the science of deriving information about Earth's land and water areas from images acquired at a distance. It usually relies upon measurement of electromagnetic energy reflected by or emitted from the features of interest.

Remote sensing typically uses an electromagnetic sensor such as a camera (often a digital camera) or radar device, an airborne platform carrying the electromagnetic sensor and a position and attitude sensor.

In order to use the imagery collected by the electromagnetic sensor, one must establish the relationship among the camera or sensor used to capture imagery, the imagery itself, and the ground. However, complexities permeate this relationship, including accounting for Earth's generally curved surface and the flatness of the light-collecting surfaces of sensors, film, images and maps; the distortion created by optical systems such as lenses; and the unique position and orientation (and therefore unique perspective) sensors have in a remote-sensing system. Although one of ordinary skill well understands these complexities, for completeness relevant aspects of the relationship among the sensor, the imagery and the ground, including certain commonly used terms—such as interior orientation and exterior orientation—are discussed below.

Interior orientation defines the internal geometry of a camera or sensor as it existed at the time of image capture. Sensor design, lens distortion and the characteristics of the lens, such as focal length, determine the interior orientation. Lens distortion deteriorates the positional accuracy of image points located on the image plane and occurs when light rays passing through the lens are imprecisely bent, thereby changing the relative ray directions such that the light rays intersect the image plane at deviant positions. As a result, objects in the image will appear distorted or closer or further from each other than they really are.

Exterior orientation defines the position and angular orientation (also known as the attitude) of an image. As shown in FIG. 7, the exterior orientation involves three coordinate systems: the ground-space coordinate system (X, Y, and Z), in which all points on the ground are defined; the focal-plane coordinate system (x, y, z), on which the lens of the sensor focuses light reflected by the ground; and the image-space coordinate system, which is the positive image of the image focused by the sensor on the focal-plane coordinate system. The focal-plane and image-space coordinate systems are displaced along the z-axis by the focal length f. As a result, the perspective center O of the sensor is displaced from the center of the image-space coordinate system o by the focal length f.

Xo, Yo, and Zo define the position of the sensor in the ground-space coordinate system at any given time. Xp, Yp and Zp define the position of a ground point P on the ground-space coordinate system and xp, yp define the position in the image-space coordinate system.

Viewing FIG. 7, one of ordinary skill will appreciate that the attitude of the sensor will affect the position of the ground point's representation in the image-space coordinate system. Therefore, the attitude is typically measured while the sensor captures imagery. In FIG. 7 the attitude is illustrated using three angles, omega ($\omega$), phi ($\phi$) and kappa ($\kappa$), which define attitude about the x, y and z axes, respectively, of the focal-plane coordinate system. Since the focal-plane coordinate system and the image-space coordinate system are parallel, the three angles also define the orientation of the image-space coordinate system relative to the ground-space coordinate system.

Viewing FIG. 7 also shows that the distance between the sensor and the ground point affects the location of the representation of that ground point in the image-space coordinate system. In other words, terrain variations (otherwise known as topography) affect the image. Terrain variations are not considered part of the exterior orientation of the sensor and are not accounted for merely by knowing the exterior orientation. Rather, terrain variations are accounted for via external data that describes the terrain, such as a digital elevation model, or DEM.

The background principles just covered allow one of ordinary skill to appreciate the inventor's recognition that there remains an unsatisfied desire for a remote sensing apparatus in which a plurality of sensors can be mounted on a platform and the resultant imagery coregistered and stacked. Each of the plurality of sensors may or may not have a unique perspective. If the sensors each has a unique perspective, no two sensors collect image data from the same area on the earth through the same space that is defined between the image sensor and the field-of-view of the image sensor. The apparatus described as the preferred embodiment should, among other things, satisfy the desire to coregister and stack such a plurality of sensors.

SUMMARY OF THE INVENTION

According to an aspect of the preferred embodiment, an aerial imaging system includes a platform capable of moving through air, a spatial sensor, a plurality of image sensors and a computer. The spatial sensor collects position data indicating the position of the platform. The plurality of image sensors includes a key sensor and at least one non-key sensor. The computer includes a storage device and a processor configured to execute instructions comprising the steps of (i) controlling the plurality of image sensors to collect image data simultaneously, (ii) determining the exterior orientation of the key sensor based on the position data, and (iii) determining the exterior orientation of at least one non-key sensor based on the exterior orientation of the key sensor.

According to another aspect of the preferred embodiment, a method of remote sensing includes the steps of determining the interior orientations of a plurality of image sensors, which includes a key sensor and at least one non-key sensor, collecting platform position data from a spatial sensor; determining a relationship between the key sensor and the spatial sensor; determining a relationship between the at least one non-key sensor and the key sensor; determining the exterior orientation of a key sensor based on the platform position data collected from the spatial sensor and the relationship between the key sensor and the spatial sensor; and determining the exterior orientation of at least one non-key sensor based on the exterior orientation of the key sensor and the relationship between the key sensor and the at least one non-key sensor.

DETAILED DESCRIPTION OF THE PREFERRED EMBODIMENTS

Figure 1:
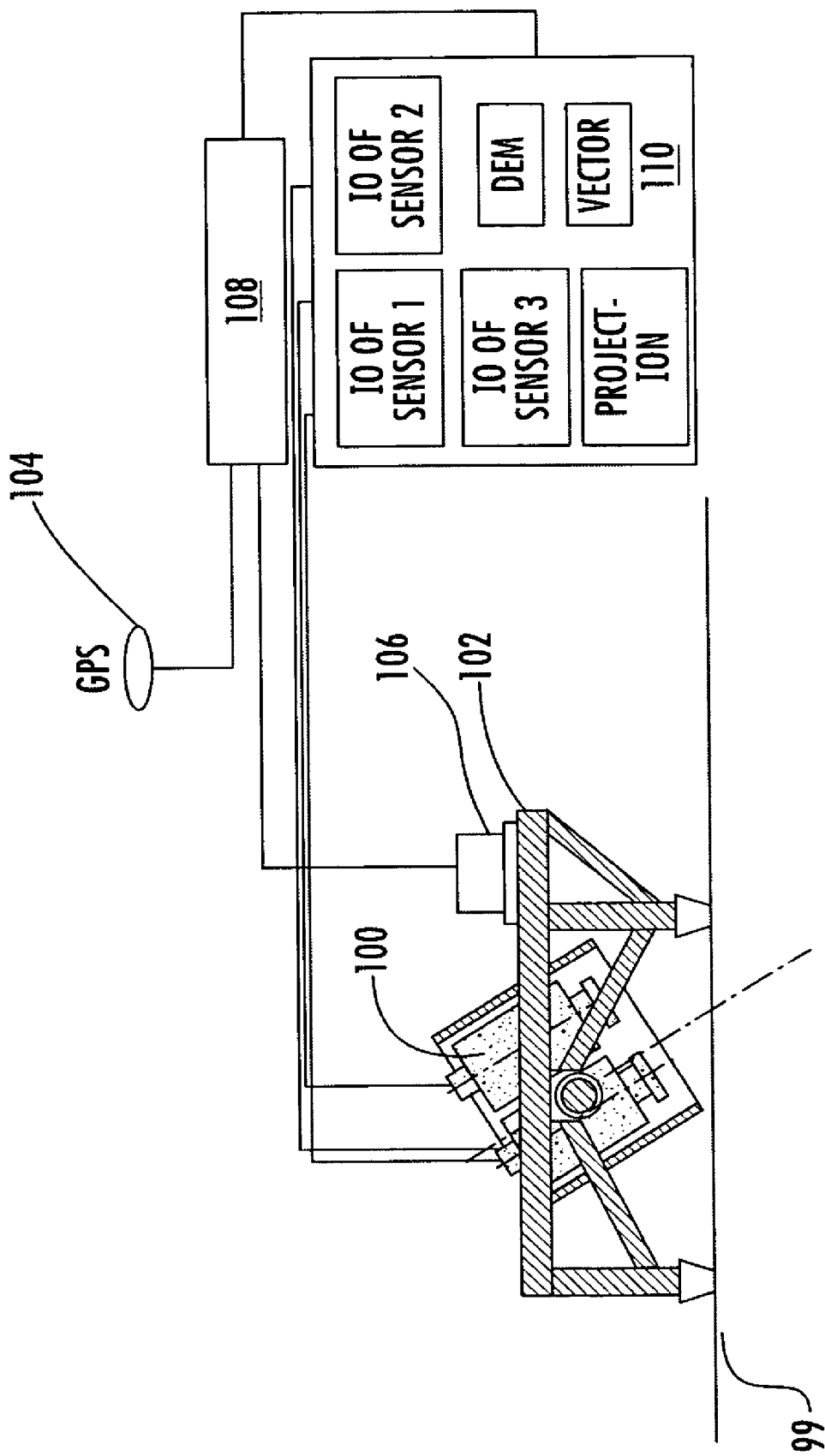
FIG. 1 is a schematic representation of the remote sensing system according to the preferred embodiment.

As shown in FIG. 1, the aerial mapping system of the preferred embodiment includes an aircraft 99 carrying a plurality of image sensors 100 and processing equipment. The plurality of image sensors 100 are mounted on a platform or frame 102 that is in turn mounted to the aircraft. Each of the sensors could be produced by different manufacturers and be designed to collect light from the same or various bands in the electromagnetic spectrum such as infrared, ultraviolet, visible-light, and other bands of electromagnetic wavelengths. In addition, each sensor could have the same or a different footprint on the ground from the other sensors, although the sensors are preferably fixed in the aircraft in such a way that 60 to 80% of the footprints overlap during a flight (even if the distance between the ground and the aircraft during the flight varies to some extent). In addition to having different footprints, each sensor may have unique interior orientation parameters owing to its unique circumstances during manufacturing. In the embodiment shown in FIG. 1, the plurality of image sensors 100 oscillate as a group on a gimbal, although this configuration is not essential and the sensors could instead be fixed.

Each image sensor can be controlled to collect an image when triggered and to lie dormant otherwise. The act of collecting an image is called triggering the sensor. As discussed below, if the sensor uses digital methods to collect imagery, a computer sends a trigger pulse to collect an image using the sensor. The sensor may also be an analog sensor, in which case the trigger pulse is a typical shuttering action.

In addition, some or all of the plurality of sensors 100 could be non-image sensors, such as lidar sensors, synthetic-aperture-radar sensors or real-aperture-radar sensors. Certain pre-processing may be required to convert data from such sensors into an image for coregistration.

As further illustrated in FIG. 1, in addition to image sensors, the aircraft 99 carries a spatial sensor that senses the position and attitude of the sensor frame. The spatial spatial sensor includes, preferably, a GPS receiver 104 and an IMU 106, which together with a position computer 108 form an Inertial Navigation System (called an INS). The position computer 108 integrates data from the IMU 106 and the GPS receiver 104 to solve for an instantaneous attitude of the sensor frame and its instantaneous position, which includes a reference to the earth (e.g., latitude/longitude). Applanix Corp. of Richmond Hill, Ontario and Leica Geosystems Geospatial Imaging of Norcross, Ga. produce or are capable of producing INSs. Each of the GPS receiver, IMU and image sensors feed data to at least the position computer 108, which preferably sends processed position data to a primary computer 110 that includes processors and storage media. As shown in FIG. 1, the plurality of image sensors 100, the GPS receiver 104, the IMU 106, the position computer 108 and the primary computer 110 are electrically interconnected.

Incidentally, the position computer 108 and the primary computer 110 are shown as separate units since they are typically constructed that way in commercial embodiments. Nevertheless, one of ordinary skill will appreciate that the position computer 108 and the primary computer 110 can be integrated into a single computer without any change in the concept of operation.

Preferably, the INS comprises a GPS receiver and an IMU because they work well together to provide ground reference points more frequently or more accurately than, for example, a GPS receiver alone can. (Varying slightly from what may be an accepted, narrow definition, the term GPS means any kind of satellite-based positioning system, including GLONASS and Galileo, in this patent application.) A typical GPS receiver receives a position with respect to the earth at least about 60 times a second, and a typical IMU collects acceleration data in the interim. The acceleration data is twice integrated to obtain a position, and the integration constants are resolved using the GPS position data.

Notwithstanding this preferred configuration comprising a GPS and IMU, one of ordinary skill appreciates that current technology allows variations in this respect. For example, one may use a high-precision, low-drift IMU as a sole spatial sensor and begin a flight from a well-documented reference point. The IMU can record attitude acceleration (that is, rotation about each of the three principal axes), linear acceleration (that is, left and right and up and down), or both. In addition, rather than a GPS, a starfinder could be used. A number of other, well-known variations are possible.

Regardless of the arrangement of the spatial sensors, the primary computer 110 shown in FIG. 1 holds data in storage devices, which could be mass-storage devices such as CDs and hard drives or memory devices such as RAM. The data includes at least the interior orientation data of the sensors and relative vectors (which will be described in more detail later), and preferably includes other, optional data such as a digital elevation model, vector data (that can depict features such as roads and rivers) and a map list with projection transformations.

To facilitate processing of the data from the sensors, preferably a key sensor (also called a primary sensor) is chosen among the plurality of sensors, and one or more of the other sensors is boresighted, or relatively oriented, to this key sensor. This means that the data collected by the non-key sensors are transformed to overlie the key sensor's image data set so that a pixel in an image by the key sensor can correspond to a pixel in an image by every other sensor.

Figure 2:
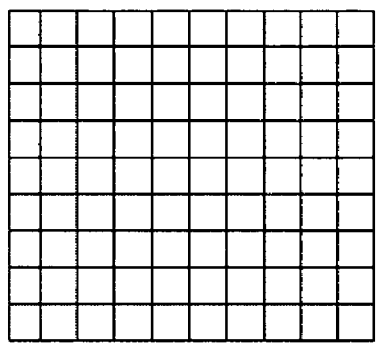
FIG. 2 and FIG. 3 illustrate possible geometric distortion in imagery.
Figure 3:
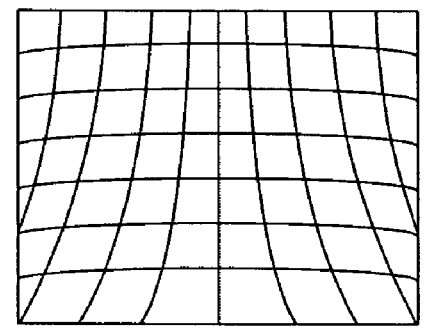

To illustrate the preferred embodiment, assume an actual view of the ground as seen from above appears as a grid of straight lines intersecting regularly at right angles, as shown in FIG. 2. The image of the ground taken by the key sensor during a flight—because of the sensor's interior and exterior orientation—might appear as curvilinear lines intersecting at irregular angles as shown in FIG. 3. (The distorsions in FIG. 3 have been exaggerated.) According to the preferred embodiment, the data collected by each of the non-key sensors is transformed to the image space of the key sensor so that any object that happens to appear in the key sensor image and a non-key sensor image is the same size and shape in both sensor images. In addition, the pixels making up the objects have the same locations in every image. A preferred method of and apparatus for performing these transformations is discussed hereinafter.

There are three principle sets of data stored in the primary computer 110, in addition to the interior orientation data of each sensor, and, optionally, the digital elevation model (DEM), vector data and projection data. (As previously mentioned, the primary computer 110 is not exclusively qualified to store this data; other computers could store and process the information without departing from the scope of the invention.) The three sets are a key vector describing the position of the key sensor relative to the GPS receiver, relative vectors describing the positions of the non-key sensors relative to the key sensor, and the average height above the terrain for the planned flight.

The key vector allows the computer to determine the position and attitude of the key sensor based on the information from the INS. Analogously, the relative vectors allow the computer to determine the position and attitude of the non-key sensors based on the position (and attitude) of the key sensor. As will be discussed in an example below, the average height above the terrain can be an input, along with the key and relative vectors, to allow the computer to determine a matrix (or, stated in another way, a transformation) for an image-to-image transformation (also known as a coregistration).

The relative vector is usually necessary because each sensor is usually mounted in the aircraft adjacent to another sensor. As a result, each sensor has a unique perspective, rather than looking through the same space to an identical area on the ground.

Figure 4A:
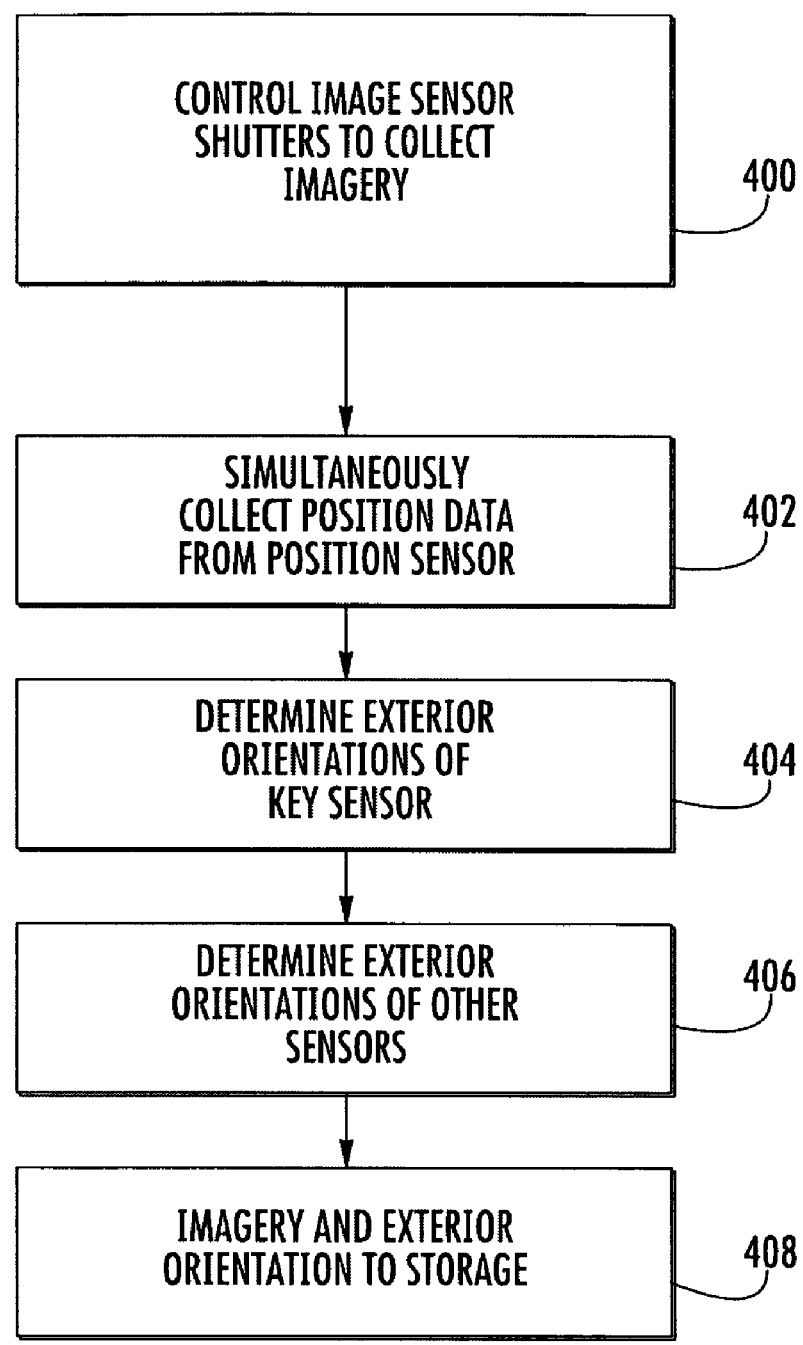
FIG. 4A and FIG. 4B are flow diagrams of the data-processing flow according to the preferred embodiment.
Figure 4B:
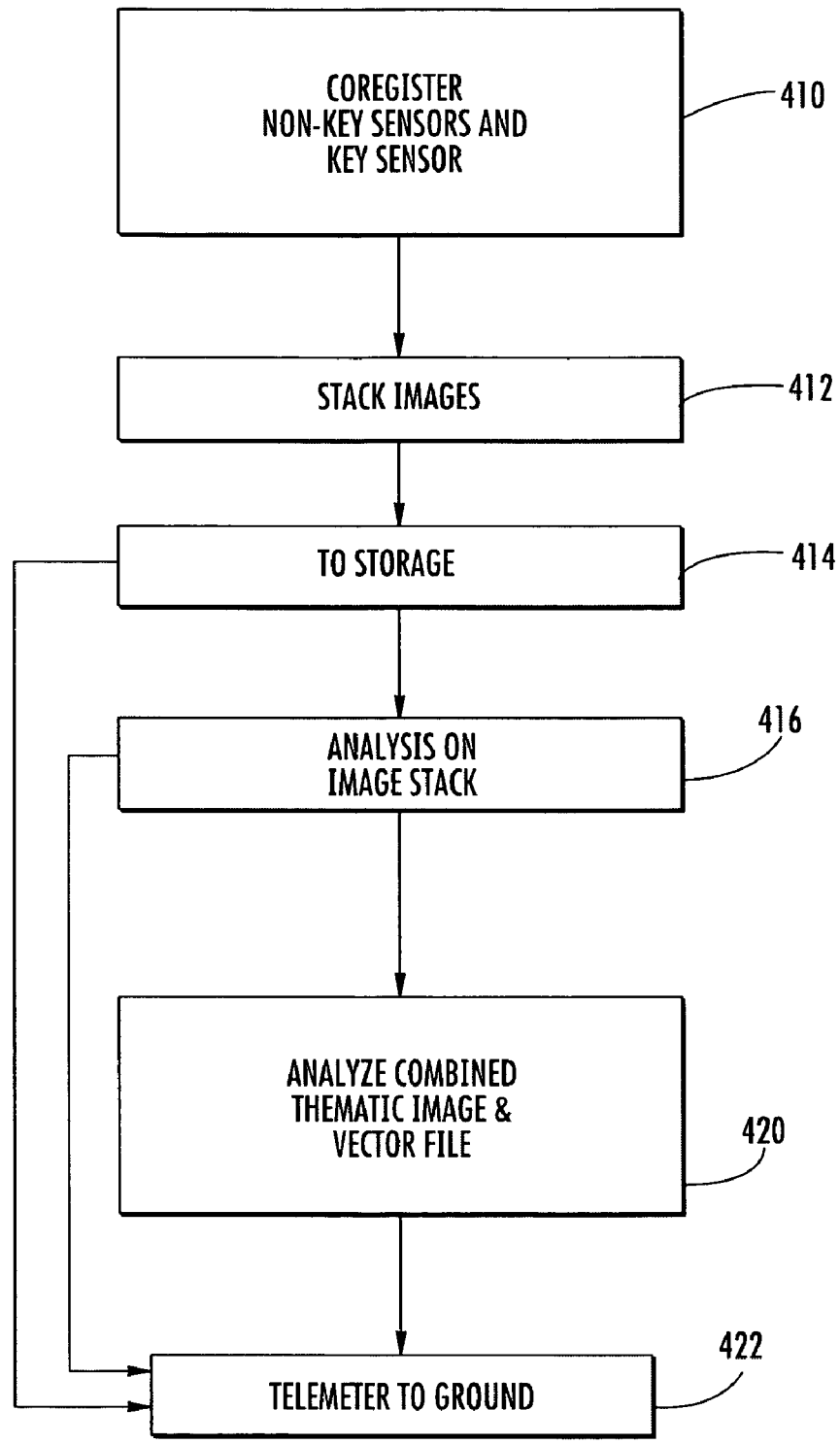

To better understand the preferred embodiment, consider the schematic processing workflow shown in FIG. 4A and FIG. 4B. A computer (such as the primary computer 110) controls in step 400 the trigger pulse for each of the plurality of image sensors 100 so that the sensors collect data simultaneously. At the same time or nearly at the same time that the sensors collect image data, the primary computer 110 collects in step 402 position data from the spatial sensor and uses the position data to determine the exterior orientation of the key sensor, as shown in step 404. Having thus collected the exterior orientation of the key sensor, the primary computer 110 calculates the matrix representing the transform from the non-key sensors to the key sensor to determine the exterior orientation of the non-key sensors (step 406). The exterior orientation data for and imagery from each sensor is then stored in the computer's mass-storage device in step 408.

Step 400 through step 408 are preferably completed for each set of images at a rate of preferably one data set every about two seconds to every about half second. In other words, as the shutters are opened on each of the set of image sensors and raw image data is collected, the computer creates a file including the raw image data and the external orientation data as described previously and stores that file preferably about every two seconds to about every half second. Step 408 is used as a buffer because subsequent processing (described with reference to FIG. 4B) may be too slow. However, if the primary computer 110 is sufficiently fast to process each data set about every two to about every half second, then step 408 may not be necessary.

As further illustrated in FIG. 4B, the computer reads the interior and exterior orientations from the storage device, and transforms the raw image data of the image sensors using the orientation data to permit image-to-image coregistration with the data of the key sensor (step 410). A simple, first-order polynomial transformation (also known as an affine transformation) may be suitable for applications in which a fast solution is desired at the expense of some accuracy. With the first-order polynomial transformation, the computer uses the relative position vector to linearly shift and/or rotate the non-key sensor image data to correspond to the key sensor image data. More complex, higher-order polynomial transformations can account for different interior orientations among the image sensors. Such higher-order polynomial transformations could warp the image data to better account for localized distortions in the imagery caused, for example, by lens distortion.

After coregistering, the computer then stacks the coregistered data of the image sensors (step 412) and preferably stores the data as a file to a storage device (preferably a disk) (step 414), where the disk acts as a buffer for subsequent analysis. The buffer may be required because an analysis algorithm might process data at a slower rate than it is collected. One of ordinary skill appreciates, however, that saving the stacked images to disk at this point is not strictly necessary.

At this point, the user has several options that may require varying computing effort. In a first mode that may require the least computing effort, the primary computer 110 simply stacks or overlays the coregistered image data of the non-key sensor and the key sensor (step 412). The stacked image data is preferably saved (step 414). Position data from the position computer 108 or the spatial sensor can optionally be associated with the stacked image or be incorporated into a stacked-image file. Alternatively, the position data can be used to georeference the stacked image. This georeferenced, stacked image can then be telemetered to the ground facility (step 422) using well-known wireless technology.

In yet another mode, an image (whether a stacked image or a thematic image, which will be described below) can be orthorectified after being georeferenced. Orthorectifying the thematic image may be useful when collecting imagery from mountainous or otherwise substantially varied terrain and the flying height is low enough for such variation to be significant. The tradeoff, however, is that orthorectifying requires additional processing power and may require additional computers in a parallel-processing environment.

In another mode that may require more computing effort, the software performs a thematic analysis in step 416 on the stacked image. The resulting thematic image groups pixels according to some criteria. For example, if looking for oil slicks, the analysis algorithm might automatically classify all pixels with certain pixel values or spectral characteristics as an oil slick to generate an "oil slick" thematic image.

Analysis disclosed herein can include performing a classifying operation on the image data. Encoding pixels to convey information, known as classification, is a well-documented and well-researched discipline that includes automated pattern recognition and artificial intelligence. Chapter 7 of the ERDAS IMAGINE Field Guide, published by Leica Geosystems Geospatial Imaging of Norcross, Ga. ($7^{th}$ Ed. 2003)—which is incorporated herein by reference—discusses classification at length. Traditional classification techniques can be applied to imagery from the remote-sensing system of the preferred embodiment in a variety of ways. For example, the primary computer 110 of FIG. 1 can be trained prior to a flight based on a series of test images. (In other words, the computer contains software that is configured to execute known classification algorithms.) This way, as the classification algorithm is run during a flight (as in step 416 of FIG. 4B), the computer is already primed to recognize patterns in the image data.

In yet another mode, the thematic image is georeferenced using the position data and combined with a vector file. Georeferencing the thematic image prior to combining with the vector file will probably be required because vector files for use with the preferred embodiment are preferably georeferenced. Thus, for the vector objects (e.g., lines, polygons) to appear in the correct location in the thematic image, both must be georeferenced. (After all, there must be some common referenced system between the vector file, which exists before the flight, and the imagery, which is generated during a flight.)

Once the vector file and thematic image are combined, an analysis algorithm can analyze both data sets jointly (step 420). The result is then preferably telemetered to a ground facility (step 422).

Consider an example in which the remote system of the preferred embodiment is used to look for ships fishing illegally. Before flight, a user stores certain information in one or both of the primary and position computers shown in FIG. 1. That information includes the interior orientations of the plurality of image sensors 100 and the key and relative vectors discussed above. (It goes without saying that the user has selected one of the plurality of image sensors 100 as the key sensor.) Additional data is optional, but in this case it makes sense for the user to store a map projection transformation, a vector file and the average flying height. (A DEM need not be used because the ocean does not change elevation.) The vector file could be a file that was created using commercially available software, such as ERDAS IMAGINE from Leica Geosystems Geospatial Imaging of Norcross, Georgia or ARCINFO from ESRI of Redlands, Calif. In this example, assume the vector file shows the regions in the ocean in which certain kinds of fishing is prohibited.

Having prepared for the flight, the user flies the sensor system over the area of interest according to a flight plan while the plurality of image sensors acquires imagery. As each image sensor collects image data, the spatial sensor simultaneously collects the position data, which with the key vector allows the computer to determine the exterior orientation of the key sensor. From the exterior orientation of the key sensor and the relative vectors, the computer determines the exterior orientation of each of the non-key sensors.

However, there has yet to be any automated analysis on the image data. To aid in the analysis, the images are stacked and the stack is analyzed. (In stacking the images, it may be necessary to account for interior orientation, in addition to the exterior orientation.) In this example, suppose the freezers of a boat that is actively fishing are uniquely detectable when the red, near infrared and thermal infrared are analyzed using an appropriate algorithm. (This is merely an example; it may not be the case that red, near infrared and thermal infrared are appropriate spectra for detecting freezers.) The analysis algorithm therefore will classify pixels in the stacked image (where the red, near infrared and thermal infrared are stacked) with the appropriate spectral characteristics as potentially an freezer. The derived image is a thematic image, preferably composed of a single layer to reduce the file size.

Figure 6:
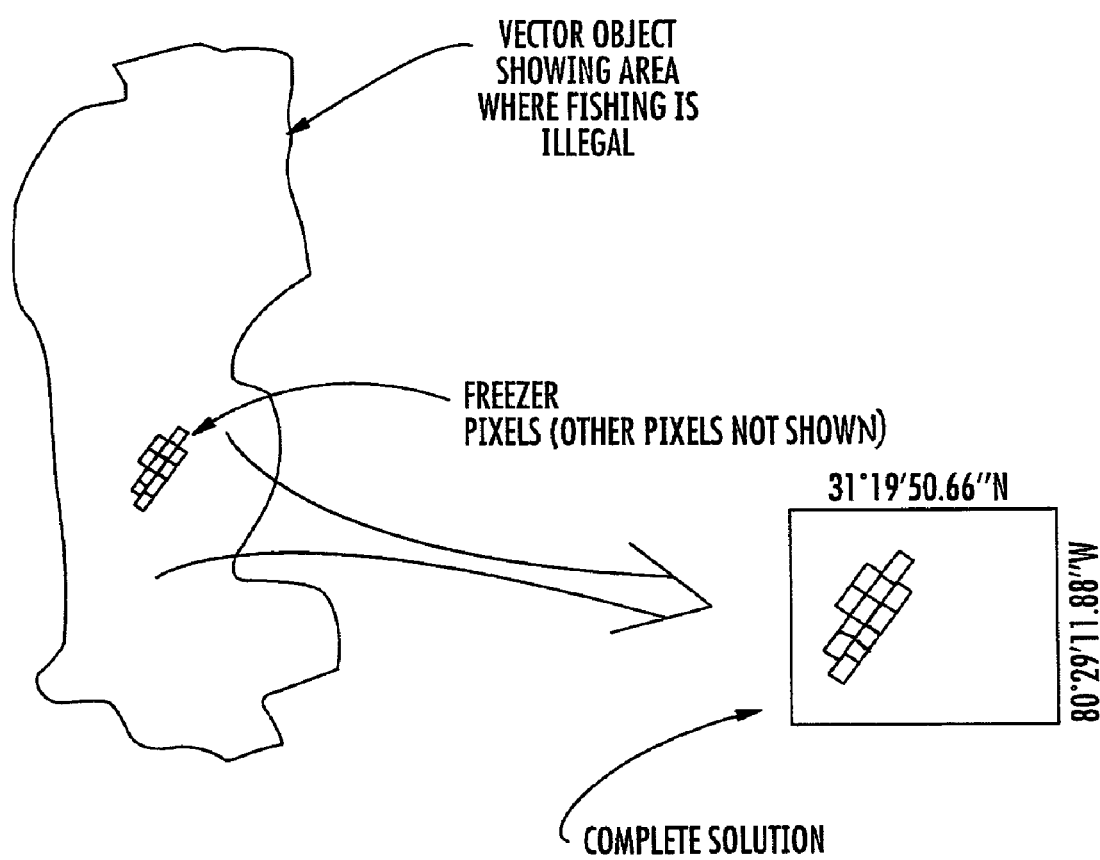
FIG. 6 shows an example of a complete solution according to the preferred embodiment that can be telemetered to a ground command center.
Figure 7:
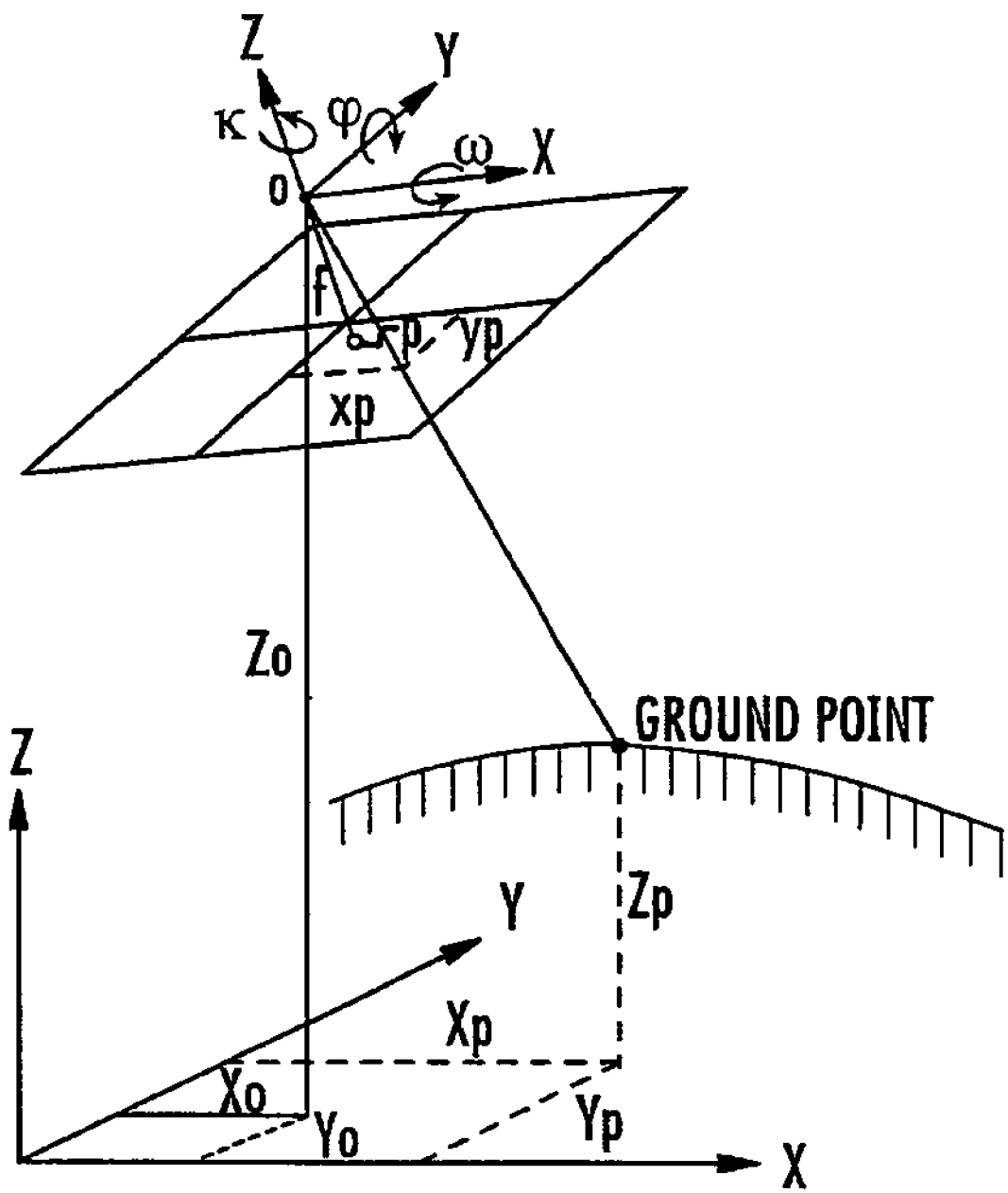
FIG. 7 is a diagram illustrating exterior orientation.

Assume for this example that the thematic image is a grayscale image in which pixels are given intensity according to the likelihood that they represent a freezer. At this point the algorithm has identified in the stacked image features that are likely an freezer, but the algorithm has not yet incorporated vector data that graphically shows where commercial fishing is illegal. So, the next step is to perform an analysis on the thematic layer, which in this example means incorporating the vector data of illegal fishing areas. At this point the thematic layer is georeferenced (orthorectification using a DEM is not required in this instance because the sea lacks height variation) and transformed to conform to the same map projection as the legal/illegal vector layer. Then the system can telemeter a complete solution to the ground facility. In this example, the complete solution might be a file containing one image layer and one vector layer. The image may have a box or other highlight showing the nexus of the thematic image and the vector layer. In other words, the complete solution will show a box around chartreuse pixels that are located in an illegal fishing vector object. As shown in FIG. 6, the complete solution preferably shows the map coordinates of the box. The complete solution is preferably telemetered to the ground. On the ground, a command post or processing center need merely view the complete solution to determine whether illegal fishing is occurring and where.

Naturally, one of ordinary skill will appreciate that the form of the complete solution can be varied. For example, rather than clipping the image to show the pixels surrounded by a box, the entire image could be telemetered to ground and some other appropriate highlighting mechanism used.

Figure 5:
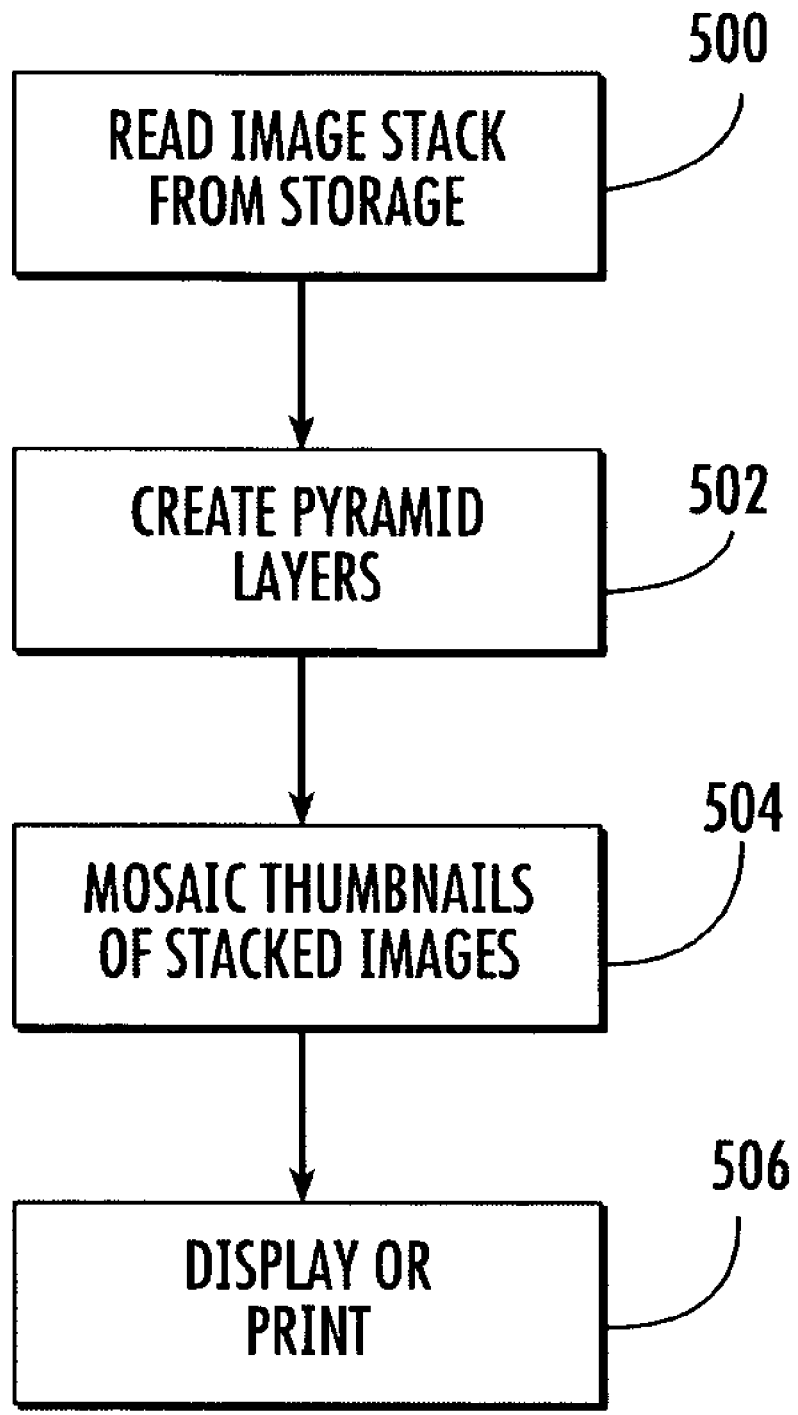
FIG. 5 is a flow diagram of the data-processing flow according to an alternative embodiment of the invention showing a process for real-time display of imagery.

An alternative embodiment is shown in FIG. 5. In contrast to the process of FIG. 4A and FIG. 4B, in FIG. 5 each set of stacked images is stored in memory so that the image stack can be quickly accessed by the computer. The computer reads the image stack (step 500) and creates, in step 502, using well-known algorithms, a plurality of layers of increasing level of detail (otherwise known as pyramid layers). One of the pyramid layers is shown on a display as a thumbnail (i.e., a reduced-resolution image) and the thumbnails of a plurality of image stacks are mosaicked in real time as the imagery is collected and processed (step 504). Finally, in step 506, a complete image (composed of several images or image stacks collected over a period of time) is displayed on an on-board monitor or can be printed. Preferably the display is interactive in that a user viewing the display can zoom in and out of the image and view different levels of detail. The user can use the displayed images to monitor the progress of the data collection during a flight. Other means can also be used to visually monitor data collection during flight, such as a motion-picture camera that collects imagery from substantially the same area of the ground as the plurality of image sensors.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

I claim:

1. An aerial imaging system comprising:
   a platform capable of moving through the air;
   a spatial sensor, wherein the spatial sensor collects at least position data indicating the position of the platform;
   a plurality of image sensors mounted to the platform, the plurality of image sensors including a key sensor and at least one non-key sensor;
   a computer including a storage device and a processor configured to execute instructions comprising the steps of (i) controlling the plurality of image sensors to collect image data simultaneously, (ii) determining the exterior orientation of the key sensor based on the position data, and (iii) determining the exterior orientation of at least one non-key sensor based on the exterior orientation of the key sensor.

2. The aerial imaging system according to claim 1, wherein the spatial sensor includes at least one of the set comprising an inertial measurement unit and a GPS receiver.

3. The aerial imaging system according to claim 1, wherein the plurality of image sensors are sensitive to at least two bands of the electromagnetic spectrum.

4. The aerial imaging system according to claim 1, wherein the spatial sensor further collects orientation data and consists of an inertial measurement unit and a position computer for determining position and orientation based on the position data and the orientation data, and at least the position data consists of acceleration data.

5. The aerial imaging system according to claim 4, wherein the acceleration data includes the set comprising at least one of attitude acceleration data of the platform and linear acceleration data of the platform.

6. The aerial imaging system according to claim 1, wherein the computer is configured to execute instructions further comprising controlling the spatial sensor to collect position data at least each time image data is collected by the plurality of image sensors.

7. The aerial imaging system according to claim 6, further comprising monitoring means for visually monitoring data collection, the monitoring means including at least one of a group including a motion-picture camera and an on-board display.

8. The aerial imaging system according to claim 1, the computer being configured to execute instructions further comprising accessing interior-orientation data for each of the key and non-key image sensors, coregistering and subsequently stacking the non-key-sensor image data and the key-sensor image data based on the interior-orientation data for each sensor and the determined exterior orientation.

9. The aerial imaging system according to claim 8, the computer being configured to execute instructions further comprising analyzing the stacked set of image data.

10. The aerial imaging system according to claim 9, wherein the step of analyzing includes performing a classifying operation on the image data.

11. The aerial imaging system according to claim 10, the computer being configured to execute instructions further comprising the steps of (i) reading auxiliary data from the storage device, the auxiliary data including at least one of vector data, a digital elevation model and map projection data, and (ii) analyzing the stacked set of image data in combination with the auxiliary data.

12. The aerial imaging system according to claim 11, further comprising a command-center computer, wherein the computer is configured to execute instructions further comprising the step of telemetering a resultant image file to the command-center computer, wherein the image file can be displayed on the command-center computer.

13. A method of remote sensing comprising the steps of:
determining the interior orientations of a plurality of sensors, which includes a key sensor and at least one non-key sensor, the plurality of sensors being mounted on a platform;
collecting platform position data from a spatial sensor;
determining a relationship between the key sensor and the spatial sensor;
determining a relationship between the at least one non-key sensor and the key sensor;
determining the exterior orientation of a key sensor based on the platform position data collected from the spatial sensor and the relationship between the key sensor and the spatial sensor; and
determining the exterior orientation of at least one non-key sensor based on the exterior orientation of the key sensor and the relationship between the key sensor and the at least one non-key sensor.

14. The method according to claim 13, wherein the plurality of sensors are image sensors, the method further comprising the step of collecting raw image data using the plurality of image sensors.

15. The method according to claim 14, further comprising controlling at least the key sensor and the at least one non-key sensor to collect data simultaneously.

16. The method according to claim 14 or 15, further comprising transforming data collected by the at least one non-key sensor into an image space of the key sensor using a polynomial transformation, wherein the inputs to the transformation include the raw image data of the at least one non-key sensor, the interior orientation of the at least one non-key sensor and the exterior orientation of the at least one non-key sensor.

17. The method according to claim 16, the method further comprising the step of coregistering the image data of the at least one non-key sensor with the image data of the key sensor, after the step of transforming the image data of the at least one non-key sensor.

18. The method according to claim 13, wherein each of the plurality of sensors has a unique perspective such that no two sensors collect image data from the same area on the earth through the same space defined between the image sensor and the field-of-view of the image sensor.

19. An aerial imaging system comprising:
a platform capable of moving through the air;
spatial sensor means collecting position data indicating the position of the platform;
a plurality of image sensors mounted to the platform, the plurality of image sensors including a key sensor and at least one non-key sensor;
means for (i) controlling the plurality of image sensors to collect image data simultaneously, (ii) determining the exterior orientation of the key sensor based on the position data, and (iii) determining the exterior orientation of at least one non-key sensor based on the exterior orientation of the key sensor.

* * * * *